(12) United States Patent
Awoniyi-Oteri et al.

(10) Patent No.: US 11,363,543 B2
(45) Date of Patent: Jun. 14, 2022

(54) TRANSMIT POWER DETERMINATION IN DUAL-ACTIVE-PROTOCOL STACK HANDOVER

(71) Applicant: QUALCOMM Incorporated, San Diego, CA (US)

(72) Inventors: Olufunmilola Omolade Awoniyi-Oteri, San Diego, CA (US); Tao Luo, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/949,109

(22) Filed: Oct. 14, 2020

(65) Prior Publication Data

US 2021/0120505 A1 Apr. 22, 2021

Related U.S. Application Data

(60) Provisional application No. 62/923,222, filed on Oct. 18, 2019.

(51) Int. Cl.
*H04W 52/40* (2009.01)
*H04W 52/34* (2009.01)
*H04W 52/14* (2009.01)

(52) U.S. Cl.
CPC ......... *H04W 52/40* (2013.01); *H04W 52/146* (2013.01); *H04W 52/34* (2013.01)

(58) Field of Classification Search
CPC ... H04W 52/34; H04W 52/40; H04W 52/146; H04B 7/0617

USPC .............. 455/522, 69, 67.11, 500
See application file for complete search history.

(56) References Cited

U.S. PATENT DOCUMENTS

| | | | | |
|---|---|---|---|---|
| 2020/0008007 | A1* | 1/2020 | Belghoul | H04W 24/08 |
| 2020/0314773 | A1* | 10/2020 | Hsieh | H04W 36/08 |
| 2021/0092654 | A1* | 3/2021 | Kadiri | H04W 36/0072 |

FOREIGN PATENT DOCUMENTS

| | | |
|---|---|---|
| EP | 3099118 A1 | 11/2016 |
| WO | 2018044693 A1 | 3/2018 |

OTHER PUBLICATIONS

Apple Inc: "Discussion on NR mobility enhancements", 3GPP Draft; R1-1910976 Discussion on NR Mobility Enhancements, 3rd Generation Partnership Project (3GPP), Mobile Competence Centre, vol. RAN WG1, No. Chongqing, China; Oct. 14, 2019-Oct. 20, 2019 Oct. 5, 2019 (Oct. 5, 2019), XP051808770 (Year: 2019).*

(Continued)

*Primary Examiner* — John J Lee
(74) *Attorney, Agent, or Firm* — Harrity & Harrity, LLP

(57) ABSTRACT

Various aspects of the present disclosure generally relate to wireless communication. In some aspects, a user equipment (UE) may determine a first transmit power that is to be used for a first transmission to a source cell and a second transmit power that is to be used for a second transmission to a target cell during a dual-active-protocol stack (DAPS) handover procedure. The UE may transmit, concurrently, the first transmission to the source cell using the first transmit power and the second transmission to the target cell using the second transmit power. Numerous other aspects are provided.

36 Claims, 10 Drawing Sheets

(56) References Cited

OTHER PUBLICATIONS

Apple Inc: "Discussion on NR Mobility Enhancements", 3GPP TSG RAN WG1 #98 bis, 3GPP Draft; R1-1910976 Discussion on NR Mobility Enhancements, 3rd Generation Partnership Project (3GPP), Mobile Competence Centre; 650, Route Des Lucioles; F-06921 Sophia-Antipolis Cedex; France, vol. RAN WG1, No. Chongqing, China; Oct. 14, 2019-Oct. 20, 2019, Oct. 5, 2019 (Oct. 5, 2019), 4 Pages, XP051808770, Retrieved from the Internet: URL: https://ftp.3gpp.org/tsg_ran/WG1_RL1/TSGR1_98b/Docs/R1-1910976. zip R1-1910976 Discussion on NR mobility enhanccements.docx [retrieved on Oct. 5, 2019] section 2.2.

Huawei, et al., "Considerations on UE Capability Coordination", 3GPP TSG-RAN WG2 Meeting #107, 3GPP Draft; R2-1910590 Considerations on UE Capability Coordination, 3rd Generation Partnership Project (3GPP), Mobile Competence Centre; 650, Route Des Lucioles; F-06921 Sophia-Antipolis Cedex; FR, vol. RAN WG2, No. Prague, Czech Republic; Aug. 26, 2019-Aug. 30, 2019, Aug. 16, 2019 (Aug. 16, 2019), pp. 1-3, XP051768366, Retrieved from the Internet: URL: http://www.3gpp.org/ftp/tsg_ran/WG2_RL2/TSGR2_107/Docs/R2-1910590.zip [retrieved on Aug. 16, 2019] section 2.

International Search Report and Written Opinion—PCT/US2020/070671—ISA/EPO—dated Mar. 25, 2021.

\* cited by examiner

TRANSMIT POWER DETERMINATION IN DUAL-ACTIVE-PROTOCOL STACK HANDOVER

CROSS-REFERENCE TO RELATED APPLICATION

This patent application claims priority to U.S. Provisional Patent Application No. 62/923,222, filed on Oct. 18, 2019, entitled "TRANSMIT POWER DETERMINATION IN DUAL-ACTIVE-PROTOCOL STACK HANDOVER," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for transmit power determination in dual-active-protocol stack (DAPS) handover.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining a first transmit power that is to be used for a first transmission to a source cell and a second transmit power that is to be used for a second transmission to a target cell during a dual-active-protocol stack (DAPS) handover procedure, wherein the first transmission and the second transmission are to be transmitted concurrently; and transmitting, concurrently, the first transmission to the source cell using the first transmit power and the second transmission to the target cell using the second transmit power.

In some aspects, a method of wireless communication, performed by a network node, may include determining a first transmit power that is to be used by a UE for a first transmission to a source cell and a second transmit power that is to be used by the UE for a second transmission to a target cell during a DAPS handover procedure, wherein the first transmission and the second transmission are to be transmitted by the UE concurrently; and transmitting, to the UE, a configuration that identifies the first transmit power and the second transmit power to enable the UE to transmit, concurrently, the first transmission to the source cell using the first transmit power and the second transmission to the target cell using the second transmit power.

In some aspects, a UE for wireless communication may include memory and one or more processors operatively coupled to the memory. The memory and the one or more processors may be configured to determine a first transmit power that is to be used for a first transmission to a source cell and a second transmit power that is to be used for a second transmission to a target cell during a DAPS handover procedure, wherein the first transmission and the second transmission are to be transmitted concurrently; and transmit, concurrently, the first transmission to the source cell using the first transmit power and the second transmission to the target cell using the second transmit power.

In some aspects, a network node for wireless communication may include memory and one or more processors operatively coupled to the memory. The memory and the one or more processors may be configured to determine a first transmit power that is to be used by a UE for a first transmission to a source cell and a second transmit power that is to be used by the UE for a second transmission to a target cell during a DAPS handover procedure, wherein the first transmission and the second transmission are to be transmitted by the UE concurrently; and transmit, to the UE, a configuration that identifies the first transmit power and the second transmit power to enable the UE to transmit, concurrently, the first transmission to the source cell using the first transmit power and the second transmission to the target cell using the second transmit power.

In some aspects, a non-transitory computer-readable medium may store one or more instructions for wireless communication. The one or more instructions, when executed by one or more processors of a UE, may cause the one or more processors to: determine a first transmit power that is to be used for a first transmission to a source cell and a second transmit power that is to be used for a second transmission to a target cell during a DAPS handover procedure, wherein the first transmission and the second transmission are to be transmitted concurrently; and transmit, concurrently, the first transmission to the source cell using the first transmit power and the second transmission to the target cell using the second transmit power.

In some aspects, a non-transitory computer-readable medium may store one or more instructions for wireless communication. The one or more instructions, when executed by one or more processors of a network node, may cause the one or more processors to: determine a first transmit power that is to be used by a UE for a first transmission to a source cell and a second transmit power that is to be used by the UE for a second transmission to a target cell during a DAPS handover procedure, wherein the first transmission and the second transmission are to be transmitted by the UE concurrently; and transmit, to the UE, a configuration that identifies the first transmit power and the second transmit power to enable the UE to transmit, concurrently, the first transmission to the source cell using the first transmit power and the second transmission to the target cell using the second transmit power.

In some aspects, an apparatus for wireless communication may include means for determining a first transmit power that is to be used for a first transmission to a source cell and a second transmit power that is to be used for a second transmission to a target cell during a DAPS handover procedure, wherein the first transmission and the second transmission are to be transmitted concurrently; and means for transmitting, concurrently, the first transmission to the source cell using the first transmit power and the second transmission to the target cell using the second transmit power.

In some aspects, an apparatus for wireless communication may include means for determining a first transmit power that is to be used by a UE for a first transmission to a source cell and a second transmit power that is to be used by the UE for a second transmission to a target cell during a DAPS handover procedure, wherein the first transmission and the second transmission are to be transmitted by the UE concurrently; and means for transmitting, to the UE, a configuration that identifies the first transmit power and the second transmit power to enable the UE to transmit, concurrently, the first transmission to the source cell using the first transmit power and the second transmission to the target cell using the second transmit power.

Aspects generally include a method, apparatus, system, computer program product, non-transitory computer-readable medium, user equipment, base station, network node, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
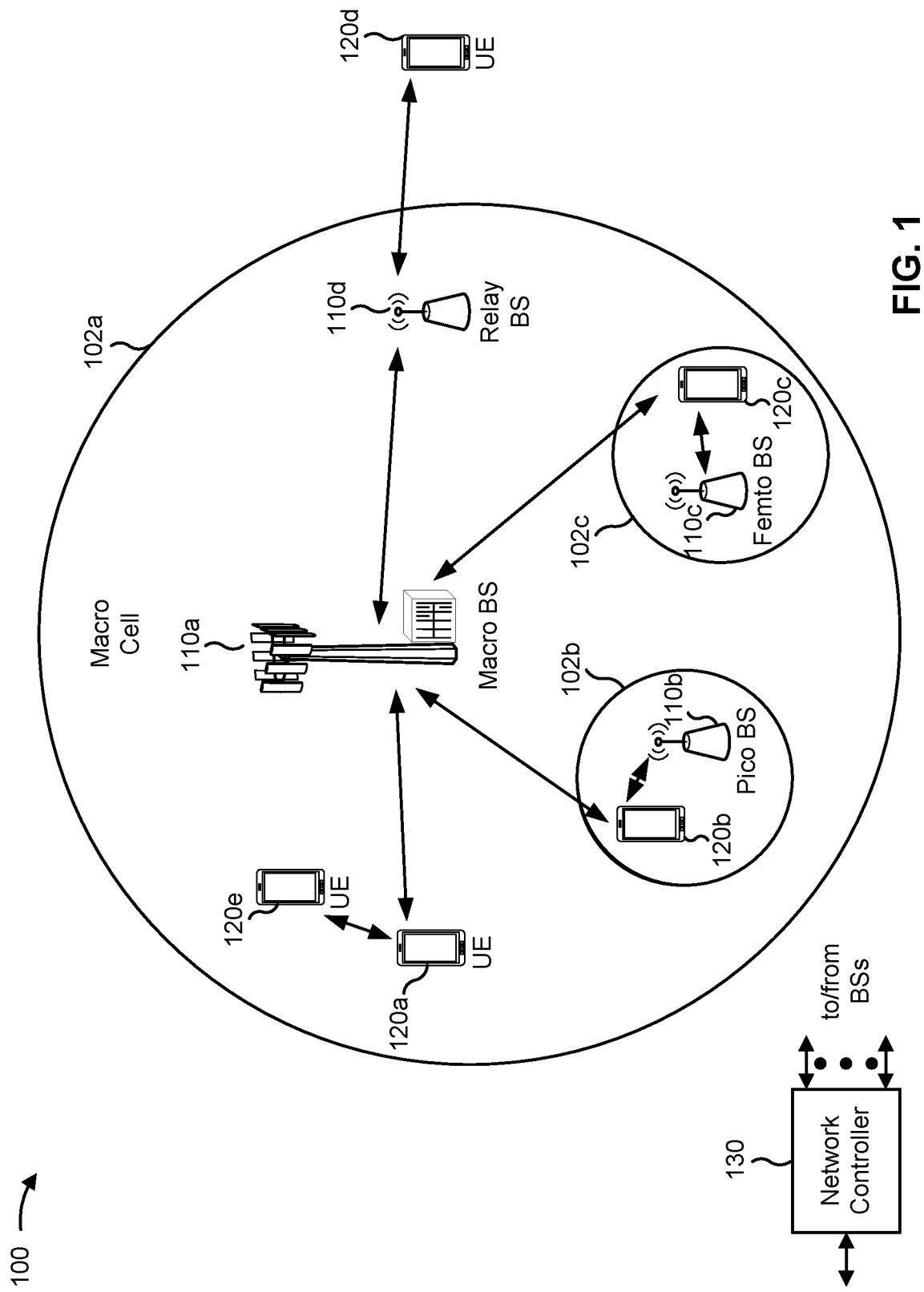
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
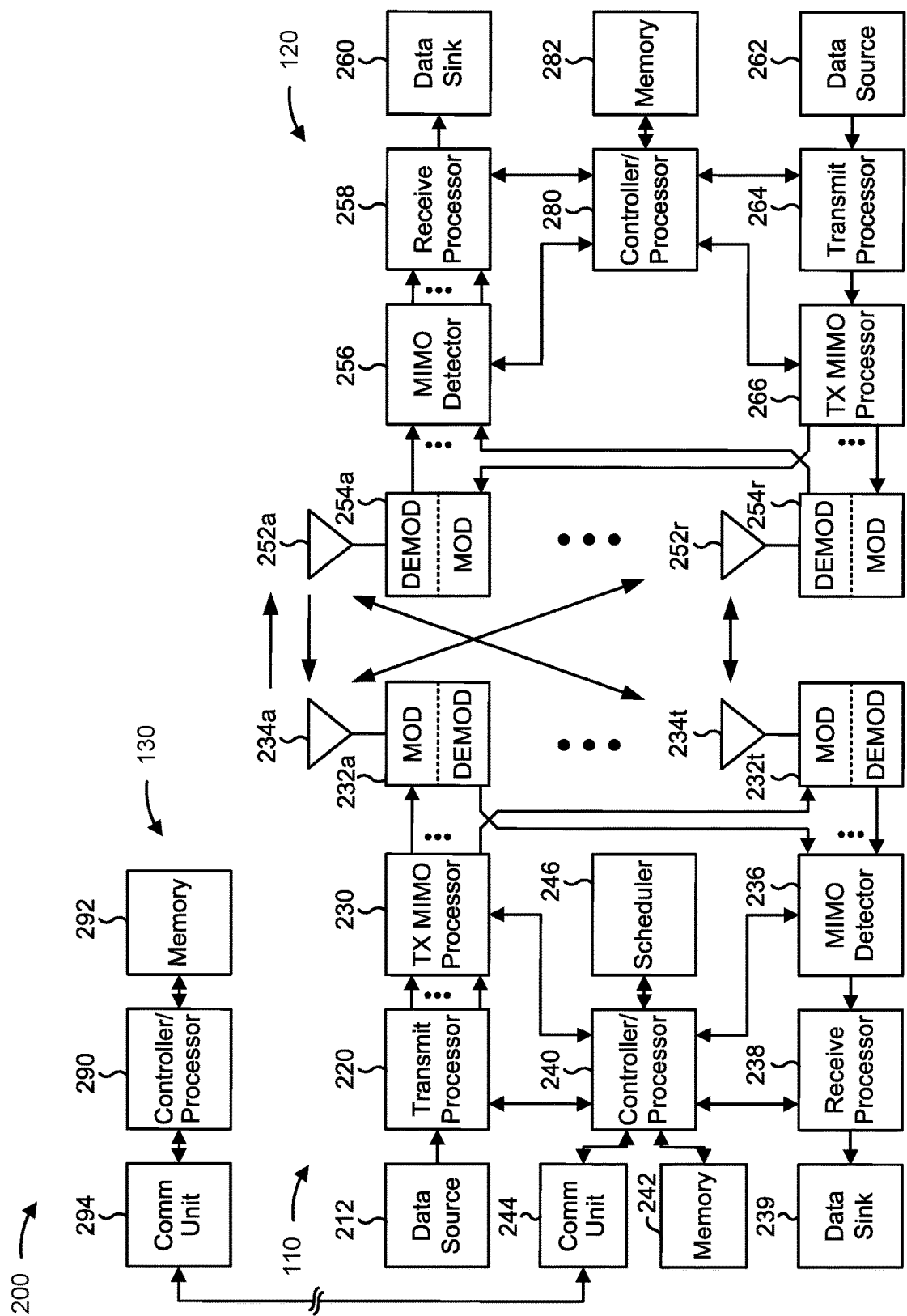
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with transmit power determination in dual-active-protocol stack (DAPS) handover, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8, process 900 of FIG. 9, and/or other processes as described herein. A scheduler 246 may schedule UEs for data transmission on the downlink and/or uplink.

In some aspects, UE 120 may include means for determining a first transmit power that is to be used for a first transmission to a source cell and a second transmit power that is to be used for a second transmission to a target cell during a DAPS handover procedure, means for transmitting, concurrently, the first transmission to the source cell using the first transmit power and the second transmission to the target cell using the second transmit power, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining a first transmit power that is to be used for a first transmission to a source cell and a second transmit power that is to be used for a second transmission to a target cell during a DAPS handover procedure, means for transmitting a configuration that identifies the first transmit power and the second transmit power, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3A:
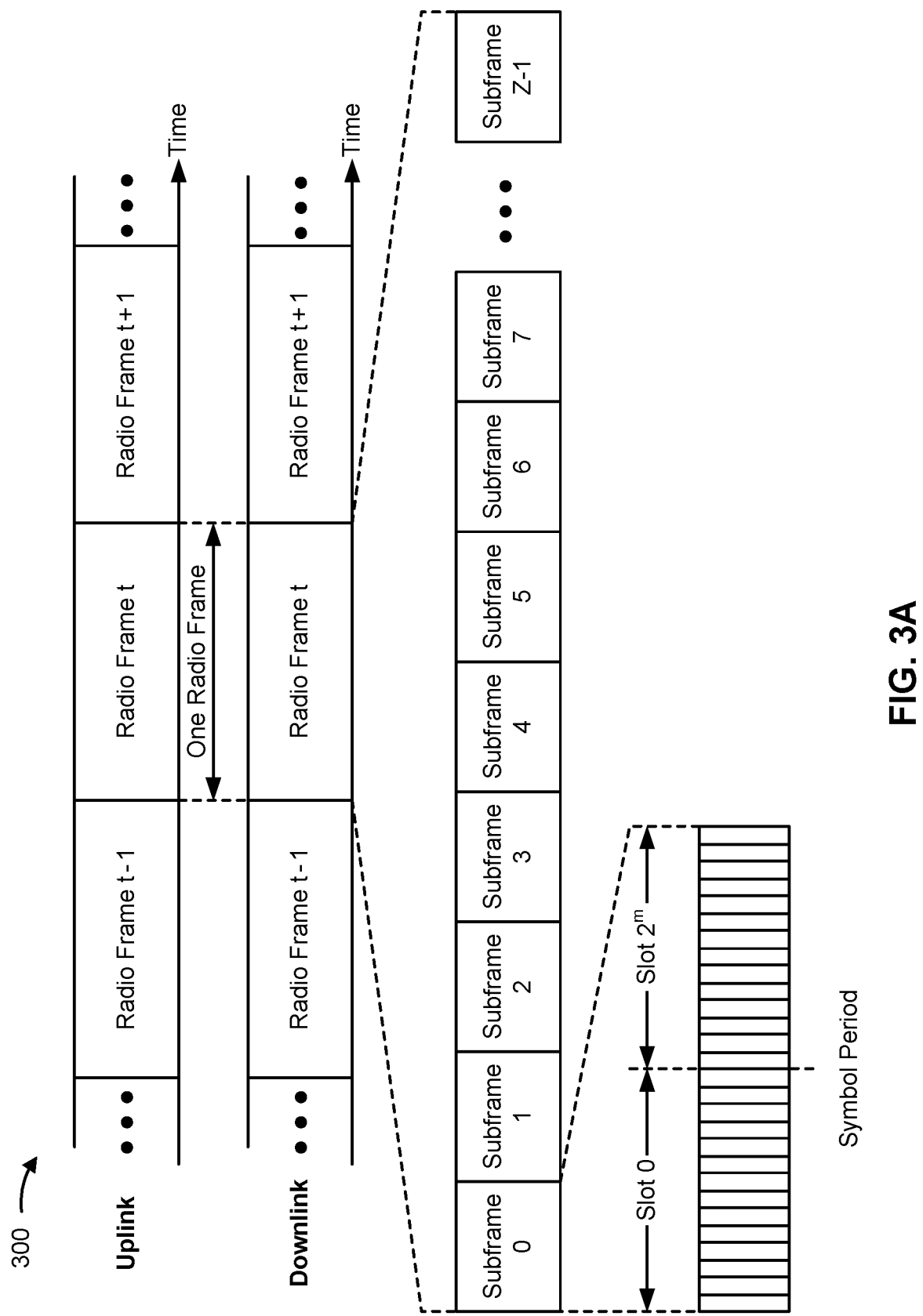
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, "wireless communication structure" may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
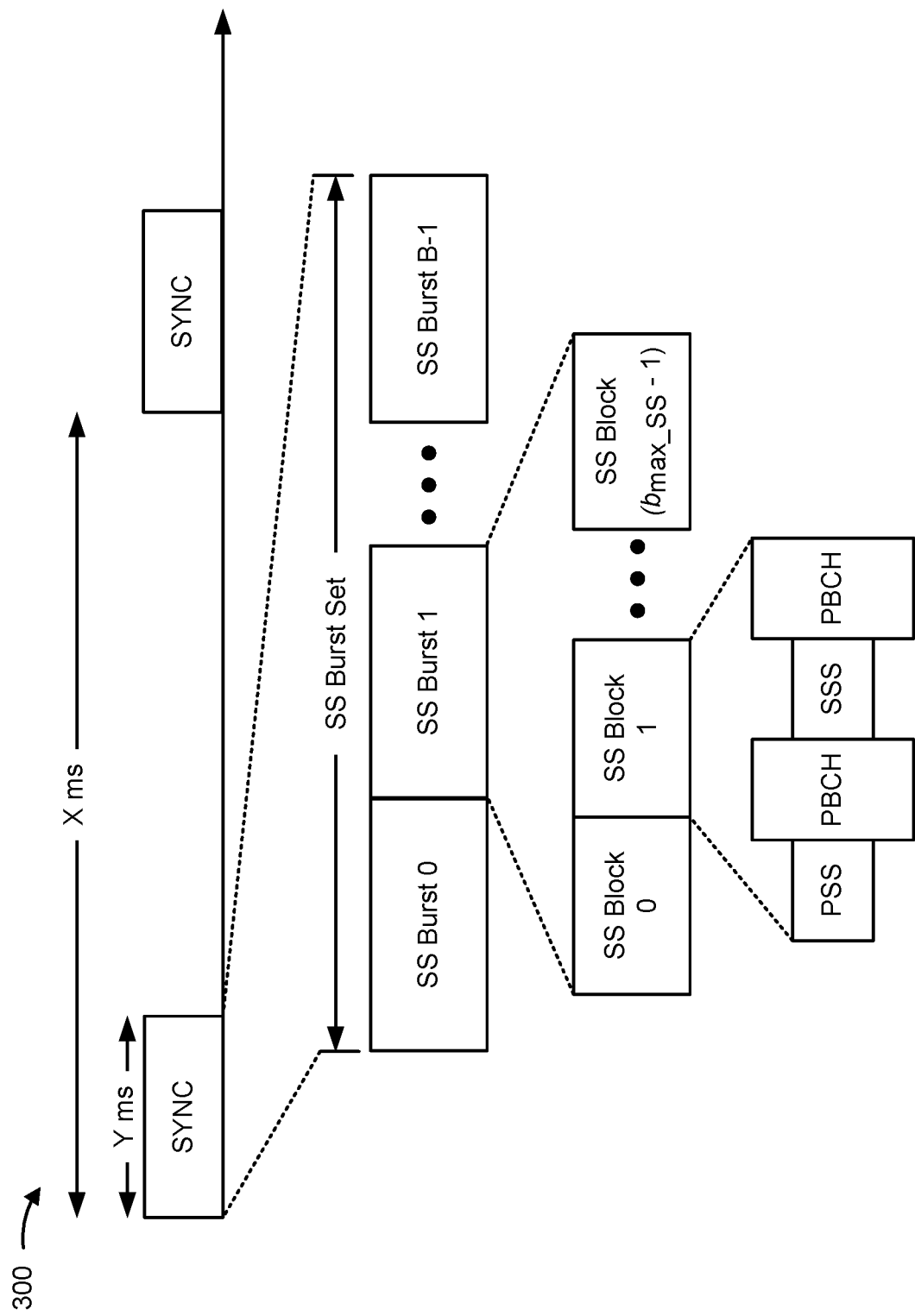
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}-1$), where $b_{max\_SS}-1$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
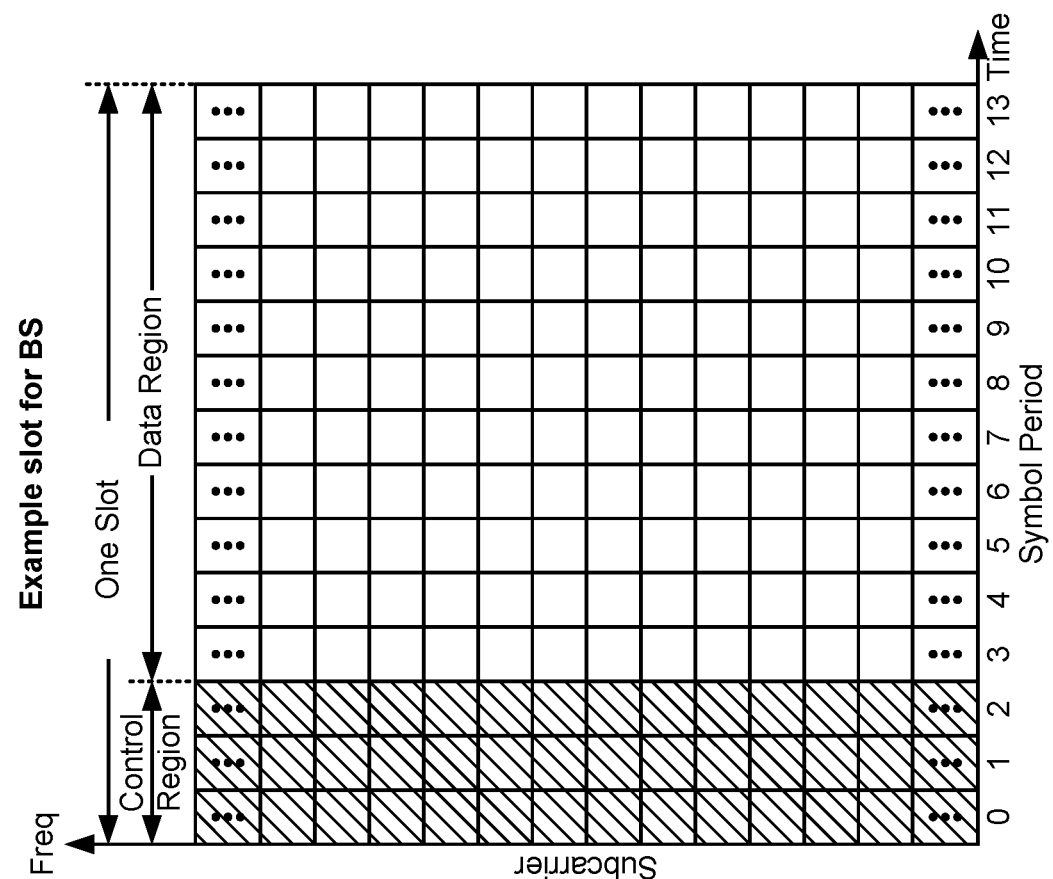
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q–1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q–1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
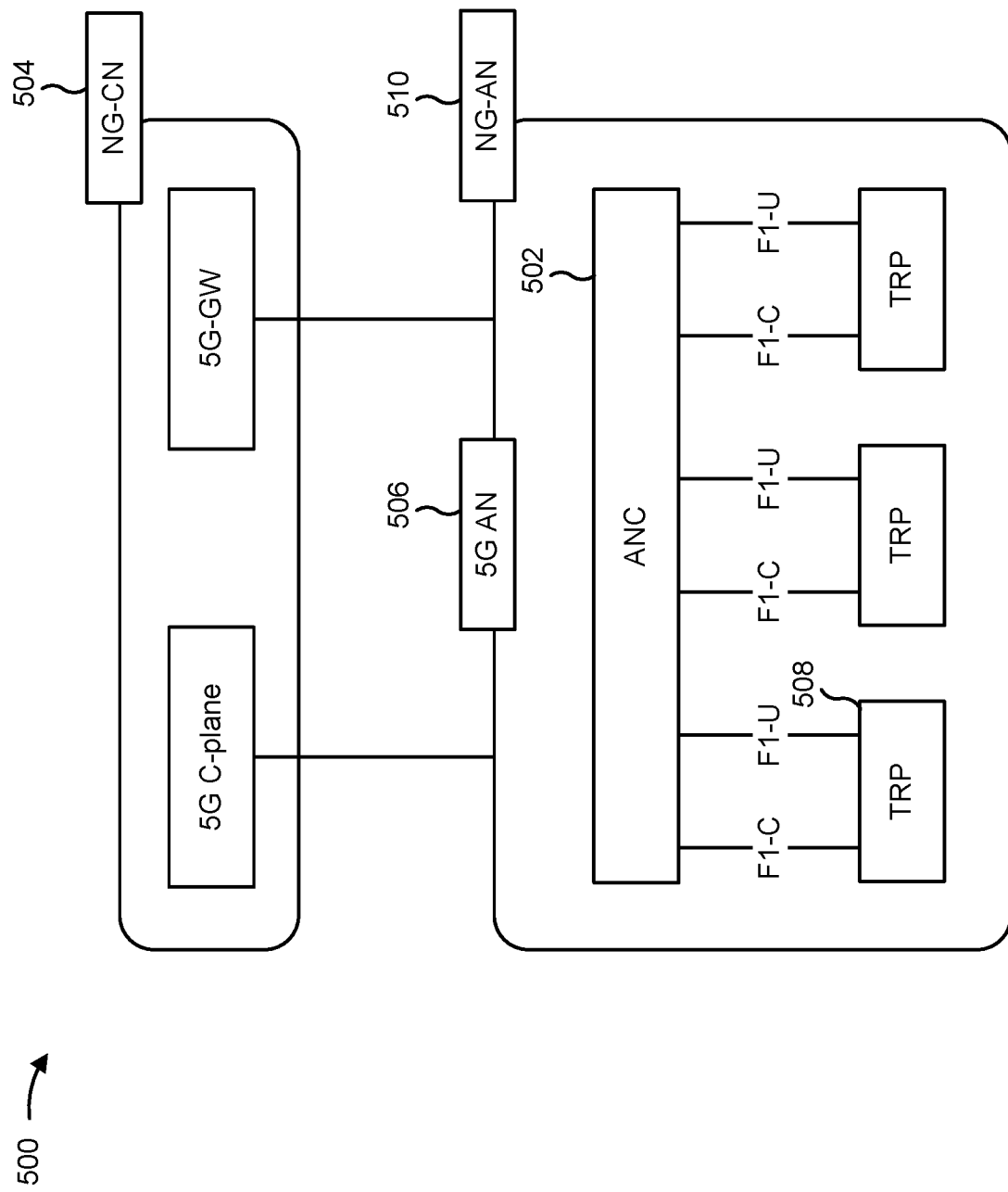
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, "TRP" may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul communication. The architecture may be defined to support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), or medium access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided as an example. Other examples may differ from what is described with regard to FIG. 5.

Figure 6:
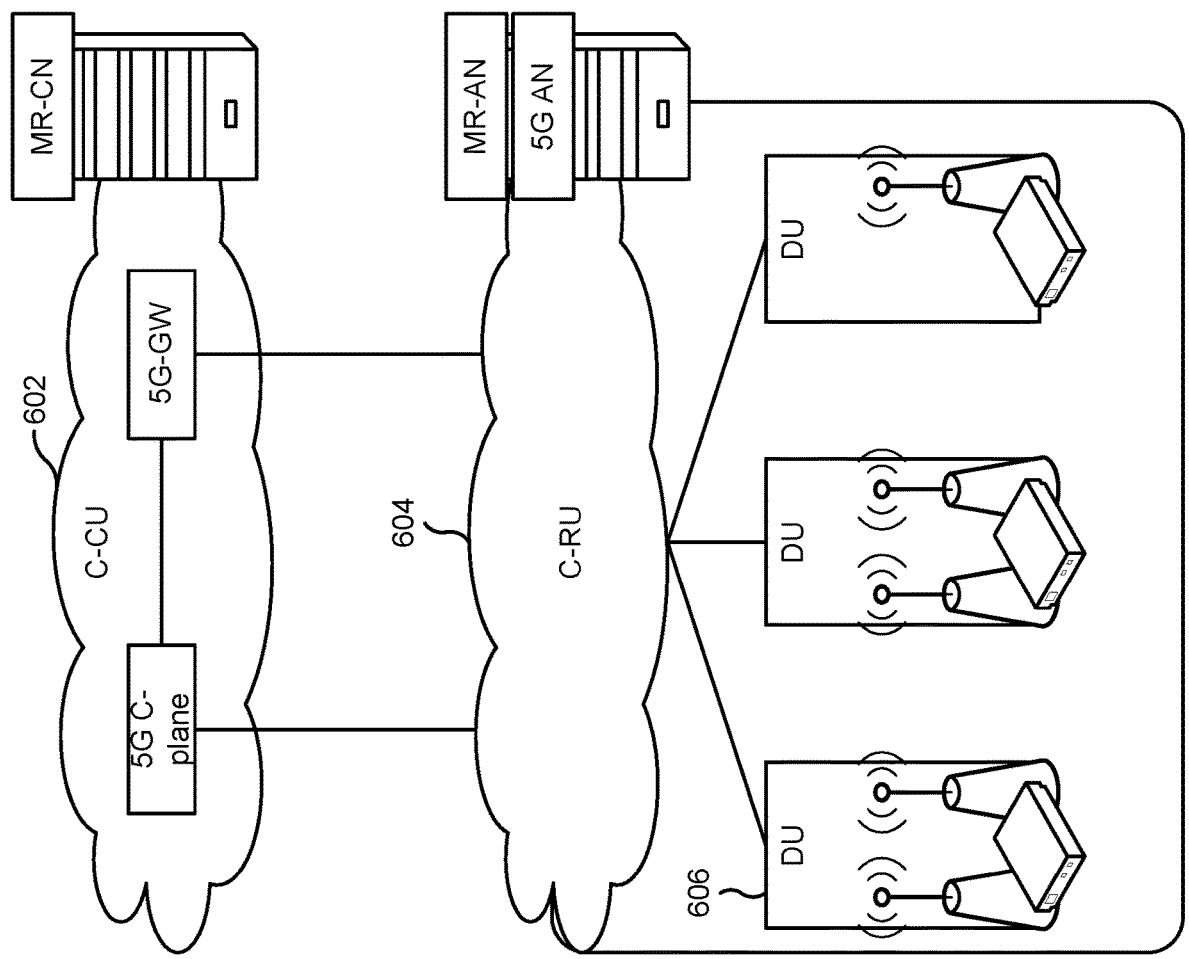
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided as an example. Other examples may differ from what is described with regard to FIG. 6.

In some cases, a first cell (which may be referred to as a source cell) may hand over a UE to a second cell (which may be referred to as a target cell). In some cases, the handover may be a DAPS handover. A DAPS handover may be a make-before-break (MBB) handover or another type of handover where the UE remains communicatively connected with the source cell while establishing a communicative connection with the target cell. Moreover, the UE may maintain separate active protocol stacks for the connection with the source cell and the connection with the target cell. For example, the UE may maintain separate active medium access layer (MAC) and/or radio link control (RLC) configurations for the source cell and the target cell, may maintain separate security handling and robust header compression (ROHC) handling for the source cell and the target cell, and/or the like. Once the connection with the target cell has been established, the UE may terminate the connection with the source cell to complete the DAPS handover.

In some cases, during the DAPS handover, the UE may be scheduled for concurrent transmissions to a source cell and a target cell. For example, the UE may be scheduled to transmit a first transmission to the source cell using a first beam, and to transmit a second transmission to the target cell using a second beam. In such cases, the UE may not be enabled to determine respective transmit powers that are to be used for the first transmission and the second transmission, such that an aggregate transmit power used for the first transmission and the second transmission does not exceed a maximum transmit power capability of the UE. Accordingly, the UE may determine respective transmit powers for the first transmission and the second transmission that do not account for a relative importance of the first transmission and the second transmission, thereby reducing successful transmissions, communication efficiency, and/or the like.

Some techniques and apparatuses described herein enable a UE to determine respective transmit powers for concurrent transmissions during a DAPS handover. For example, in some aspects, the UE may determine the respective transmit powers based at least in part on relative priorities of the concurrent transmissions. In this way, the UE may communicate with a source cell and a target cell, during a DAPS handover, with improved communication efficiency.

Figure 7:
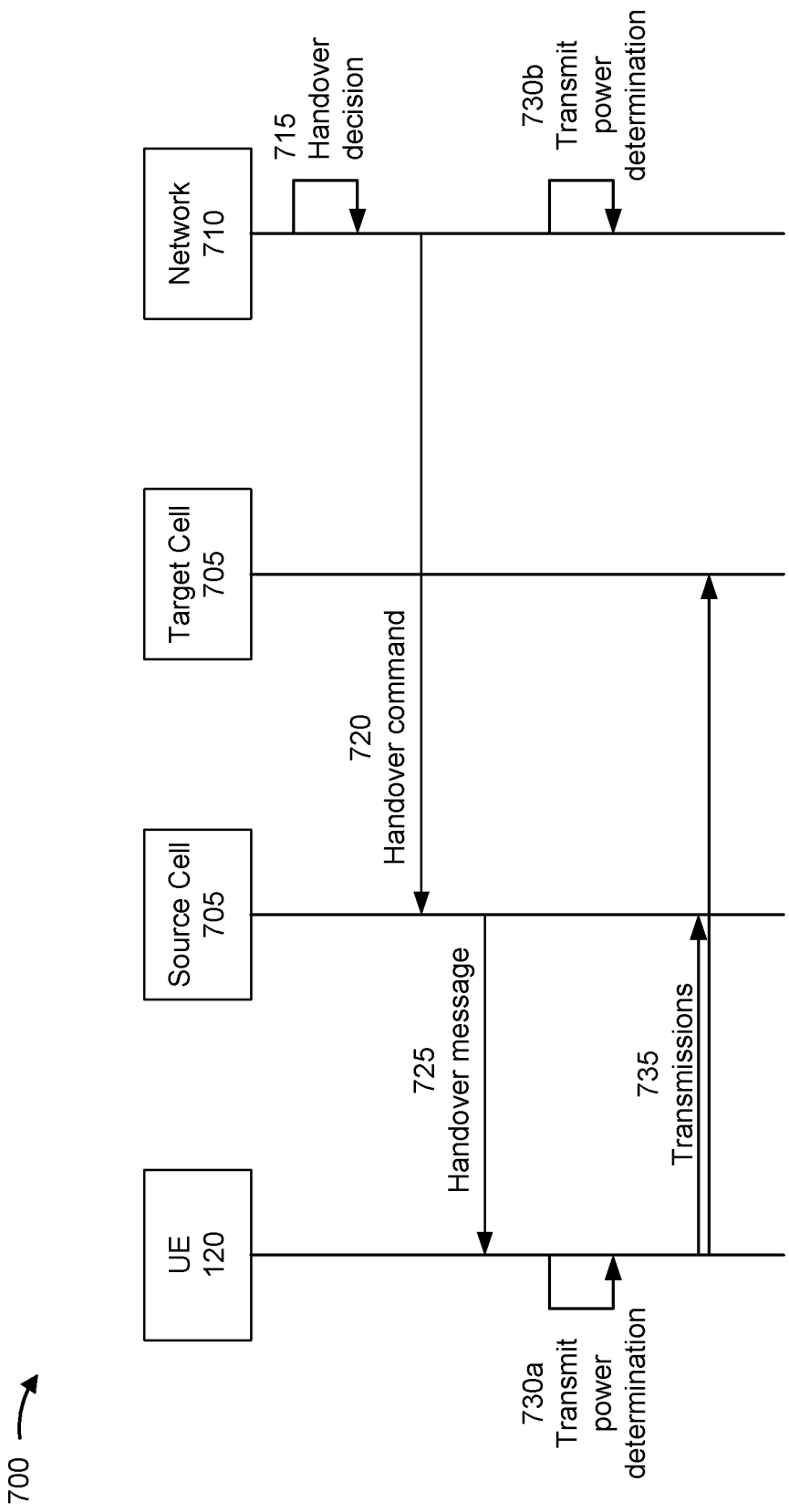
FIG. 7 is a diagram illustrating an example of transmit power determination in dual-active-protocol stack (DAPS) handover, in accordance with various aspects of the present disclosure.

FIG. 7 is a diagram illustrating an example 700 of transmit power determination in DAPS handover, in accordance with various aspects of the present disclosure. As shown in FIG. 7, example 700 may include a UE 120, a source cell 705, a target cell 705, and a core network 710. In some aspects, the source cell 705 and the target cell 705 may be included in the same wireless network (e.g., wireless network 100 and/or another wireless network), may be included in a different wireless network, and/or the like. In some aspects, the source cell 705 (e.g., a source node) and the target cell 705 (e.g., a target node) may be implemented by the same BS (e.g., BS 110) and/or may be implemented by different BSs. In some aspects, the core network 710 may be one or more devices (e.g., network nodes) of a network, such as a BS 110 implementing the source cell 705, a BS 110 implementing the target cell 705, a network controller 130, a central unit of a BS 110, a BS 110, a user plane function, and/or the like.

As shown in FIG. 7, and by reference number 715, the core network 710 (e.g., the source cell 705, the target cell 705, a central unit of a BS 110, or another device) may determine to handover the UE 120 from the source cell 705 to the target cell 705 (e.g., based at least in part on one or more measurement reports transmitted by the UE 120). In this case, the core network 710 may determine to perform a DAPS handover procedure (e.g., an MBB handover procedure) where the UE 120 remains at least partially connected to the source cell 705 while handing over to the target cell 705. In some aspects, the core network 710 may transmit a message to the target cell 705 to indicate that a handover is to occur. Additionally, or alternatively, the target cell 705 may receive another trigger that the handover is to occur, such as a message from the source cell 705, the UE 120, and/or the like.

As shown by reference number 720, the source cell 705 may receive from the core network 710 a handover command. As shown by reference number 725, the source cell 705 may transmit, and the UE 120 may receive, a handover message indicating that the UE 120 is to handover from the source cell 705 to the target cell 705. For example, the source cell 705 may convey to the UE 120 the handover command received from the core network 710. The handover message may be a radio resource control (RRC) reconfiguration message.

As shown by reference number 730a, in some aspects, the UE 120 may determine (e.g., during the DAPS handover) a first transmit power that is to be used for a first transmission to the source cell 705 and a second transmit power that is to be used for a second transmission to the target cell 705. For example, the UE 120 may determine the first transmit power and the second transmit power based at least in part on a determination that the first transmission and the second transmission are to be transmitted concurrently (e.g., the first transmission and the second transmission are to overlap in a same resource, in a same slot, in a same symbol, and/or the like). As an example, the UE 120 may determine that the first transmission and the second transmission are to be transmitted concurrently based at least in part on a scheduling of the first transmission and a scheduling of the second transmission. In some aspects, the UE 120 may determine a sequence or a pattern of first transmit powers and second transmit powers that are to be used, based at least in part on a sequence or a pattern of scheduled first transmissions and second transmissions (e.g., according to semi-persistent scheduling).

As shown by reference number 730b, in some aspects, the core network 710 (e.g., the source cell 705, the target cell 705, a central unit of a BS 110, or another device) may determine (e.g., during the DAPS handover) the first transmit power (e.g., a first maximum transmit power) that is to be used for the first transmission to the source cell 705 and the second transmit power (e.g., a second maximum transmit power) that is to be used for the second transmission to the target cell 705. For example, the core network 710 may determine the first transmit power and the second transmit power based at least in part on a determination that the first transmission and the second transmission are to be transmitted concurrently, as described above. In some aspects, the core network 710 may provide an indication of the determined first transmit power and second transmit power to the UE 120. For example, the core network 710 (e.g., the source cell 705, the target cell 705, a central unit of a BS 110, or another device) may transmit a message (e.g., a configuration, a transmit power control command, and/or the like) to the UE 120 that identifies the first transmit power and the second transmit power. In some aspects, the message may be the handover message of reference number 725 (e.g., an RRC reconfiguration message). In some aspects, the UE 120 may determine the first transmit power and the second transmit power based the indication provided by the core network 710.

The UE 120 or the core network 710 may determine the first transmit power and the second transmit power based at least in part on relative priorities of the first transmission and the second transmission. In some aspects, the UE 120 or the core network 710 may determine a priority between the first transmission and the second transmission. In some aspects, the priority may be determined based at least in part on whether the source cell 705 or the target cell 705 is to be dropped as part of the DAPS handover.

For example, based at least in part on the target cell 705 indicating acceptance of the handover from the source cell 705, the UE 120 or the core network 710 may determine that the source cell 705 is to be dropped, and therefore assign a lower priority to the first transmission and a higher priority to the second transmission (e.g., in a case when the first transmission and the second transmission are to occur after the indication of acceptance by the target cell 705). In such a case, the UE 120 or the core network 710 may determine that the first transmit power for the first transmission is to be zero or approximately zero.

As another example, based at least in part on the target cell 705 indicating rejection of the handover from the source cell 705, or the handover to the target cell 705 failing, the UE 120 or the core network 710 may determine that the target cell 705 is to be dropped, and therefore assign a lower priority to the second transmission and a higher priority to the first transmission (e.g., in a case when the first transmission and the second transmission are to occur after the indication of rejection by the target cell 705 or the failure). In such a case, the UE 120 or the core network 710 may determine that the second transmit power for the second transmission is to be zero or approximately zero.

In some aspects, the priority may be determined based at least in part on a type of the first transmission and/or the second transmission. In some aspects, the priority may be determined based at least in part on a quality of service (QoS) for the first transmission and/or the second transmission. For example, if the first transmission (e.g., a content of the first transmission) is associated with a higher QoS than the second transmission (e.g., a content of the second transmission), the UE 120 or the core network 710 may assign a higher priority to the first transmission and a lower priority to the second transmission. In such a case, for example, the first transmission may be associated with a URLLC service. Alternatively, if the second transmission is associated with a higher QoS than the first transmission, the UE 120 or the core network 710 may assign a higher priority to the second transmission and a lower priority to the first transmission.

In some aspects, the priority may be determined based at least in part on a type of channel associated with the first transmission and/or the second transmission. For example, the UE 120 or the core network 710 may assign a higher priority to a data transmission (e.g., a physical uplink shared channel (PUSCH) transmission) and a lower priority to a control transmission (e.g., a physical uplink control channel (PUCCH) transmission), such as acknowledgment feedback. As an example, if the first transmission is scheduled in a PUSCH and the second transmission is scheduled in a PUCCH, the UE 120 or the core network 710 may assign a higher priority to the first transmission and a lower priority to the second transmission. Alternatively, if the second transmission is scheduled in a PUSCH and the first transmission is scheduled in a PUCCH, the UE 120 or the core network 710 may assign a higher priority to the second transmission and a lower priority to the first transmission.

Based at least in part on the determined priority between the first transmission and the second transmission, the UE 120 (e.g., based at least in part on a configuration received from the core network 710) or the core network 710 may determine power scaling proportions for the first transmission and the second transmission. A power scaling proportion may represent a proportional value (e.g., a value between 0 and 1, inclusive). The UE 120 may use a power scaling proportion to adjust an initial transmit power, as described below.

In some aspects, if the first transmission is to be given a higher priority than the second transmission, the first transmission may be assigned a greater power scaling proportion than the second transmission. In some aspects, if the second transmission is to be given a higher priority than the first transmission, the second transmission may be assigned a greater power scaling proportion than the first transmission. In some aspects, if the first transmission and the second transmission are to be given an equal priority, the first transmission and the second transmission may be assigned equal power scaling proportions.

In some aspects, the UE 120 or the core network 710 may determine the first transmit power (P1) as a first proportion ($\alpha$) of a first initial transmit power (P'1) determined for transmissions to the source cell 705 (e.g., $\alpha$ P'1≤P1), and the second transmit power (P2) as a second proportion ($\beta$) of a second initial transmit power (P'2) determined for transmissions to the target cell 705 (e.g., $\beta$ P'2≤P2). The UE 120 or the core network 710 may determine the first initial transmit power and the second initial transmit power using a transmit power calculation (e.g., as defined in 3GPP Release 15). For example, the UE 120 or the core network 710 may determine the first initial transmit power and the second initial transmit power based at least in part on a channel quality of an uplink channel, a channel condition of an uplink channel, a path loss of an uplink channel, a distance, and/or the like, between the UE 120 and the source cell 705 or the target cell 705, respectively. The first proportion and the second proportion may correspond to the power scaling proportions determined for the first transmission and the second transmission, respectively. Accordingly, the first transmit power may be a combination (e.g., product) of the power scaling proportion determined for the first transmission and the first initial transmit power, and the second transmit power may be a combination (e.g., product) of the power scaling proportion determined for the second transmission and the second initial transmit power.

In some aspects, the first transmit power (e.g., a product of the power scaling proportion determined for the first transmission and the first initial transmit power) and the second transmit power (e.g., a product of the power scaling proportion determined for the second transmission and the second initial transmit power) are selected such that a sum of the first transmit power and the second transmit power does not exceed the threshold transmit power (Pmax) (e.g., P1+P2≤Pmax). Accordingly, the UE 120 or the core network 710 may determine the power scaling proportions such that a sum of the first transmit power and the second transmit power do no exceed the threshold transmit power. The threshold transmit power may correspond to a maximum transmit power of the UE 120.

As shown by reference number 735, the UE 120 may transmit the first transmission to the source cell 705 and transmit the second transmission to the target cell 705. That is, the UE 120 may transmit the first transmission using the first transmit power and the second transmission using the second transmit power. As described above, the UE 120 may transmit the first transmission and the second transmission during the DAPS handover procedure involving the source cell 705 and the target cell 705.

Moreover, the UE 120 may transmit the first transmission and the second transmission concurrently (e.g., the first transmission and the second transmission may overlap in a same resource, in a same slot, in a same symbol, and/or the like). In some aspects, the first transmission and the second transmission may be spatially multiplexed. For example, the UE 120 may transmit the first transmission to the source cell 705 using a first beam, and may transmit the second transmission to the target cell 705 using a second beam.

In this way, the UE 120 may transmit the first transmission and the second transmission concurrently during a DAPS handover procedure according to transmit power levels that account for relative priorities of the first transmission and the second transmission. In some aspects, the description of example 700 may apply to another dual-connectivity scenario involving the source cell 705 and the target cell 705. Moreover, in some aspects, the description of example 700 may apply to a scenario in which more than two transmissions of the UE 120 are to occur concurrently, such as a scenario involving multiple target cells 705.

As indicated above, FIG. 7 is provided as an example. Other examples may differ from what is described with respect to FIG. 7.

Figure 8:
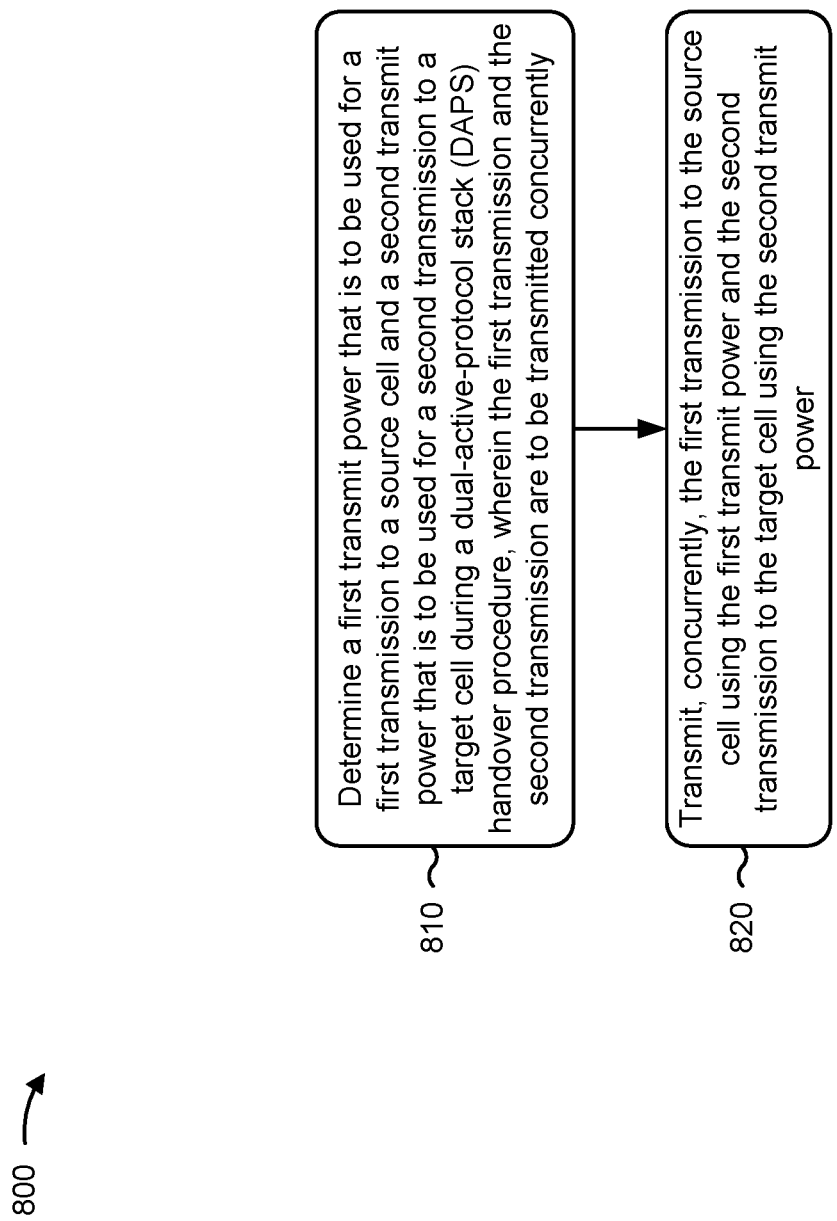
FIG. 8 is a diagram illustrating an example process performed, for example, by a UE, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120, and/or the like) performs operations associated with transmit power determination in DAPS handover.

As shown in FIG. 8, in some aspects, process 800 may include determining a first transmit power that is to be used for a first transmission to a source cell and a second transmit power that is to be used for a second transmission to a target cell during a DAPS handover procedure, wherein the first transmission and the second transmission are to be transmitted concurrently (block 810). For example, the UE (e.g., using controller/processor 280, and/or the like) may determine a first transmit power that is to be used for a first transmission to a source cell and a second transmit power that is to be used for a second transmission to a target cell during a DAPS handover procedure, as described above. In some aspects, the first transmission and the second transmission are to be transmitted concurrently.

As further shown in FIG. 8, in some aspects, process 800 may include transmitting, concurrently, the first transmission to the source cell using the first transmit power and the second transmission to the target cell using the second transmit power (block 820). For example, the UE (e.g., using controller/processor 280, transmit processor 264, TX MIMO processor 266, MOD 254, antenna 252, and/or the like) may transmit, concurrently, the first transmission to the source cell using the first transmit power and the second transmission to the target cell using the second transmit power, as described above.

Process 800 may include additional aspects, such as any single aspect or any combination of aspects described below and/or in connection with one or more other processes described elsewhere herein.

In a first aspect, a sum of the first transmit power and the second transmit power does not exceed a threshold transmit power. In a second aspect, alone or in combination with the first aspect, the first transmission and the second transmission are spatially multiplexed. In a third aspect, alone or in combination with one or more of the first and second aspects, the first transmission is transmitted to the source cell using a first beam and the second transmission is transmitted to the target cell using a second beam.

In a fourth aspect, alone or in combination with one or more of the first through third aspects, the first transmit power is based at least in part on a first proportion of a first initial transmit power determined for transmissions to the source cell, and the second transmit power is based at least in part on a second proportion of a second initial transmit power determined for transmissions to the target cell.

In a fifth aspect, alone or in combination with one or more of the first through fourth aspects, process 800 further includes determining (e.g., using controller/processor 280, and/or the like) that the first proportion is to be greater than the second proportion based at least in part on a determination that the first transmission is to be given a higher priority than the second transmission. In a sixth aspect, alone or in combination with one or more of the first through fifth aspects, process 800 further includes determining (e.g., using controller/processor 280, and/or the like) that the second proportion is to be greater than the first proportion based at least in part on a determination that the second transmission is to be given a higher priority than the first transmission. In a seventh aspect, alone or in combination with one or more of the first through sixth aspects, process 800 further includes determining (e.g., using controller/processor 280, and/or the like) that the first proportion is to be equal to the second proportion based at least in part on a determination that the first transmission and the second transmission are to be given an equal priority.

In an eighth aspect, alone or in combination with one or more of the first through seventh aspects, the first transmit power and the second transmit power are determined based at least in part on at least one of whether the source cell or the target cell is to be dropped as part of the DAPS handover procedure, a quality of service for the first transmission or the second transmission, or a type of channel associated with the first transmission or the second transmission.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
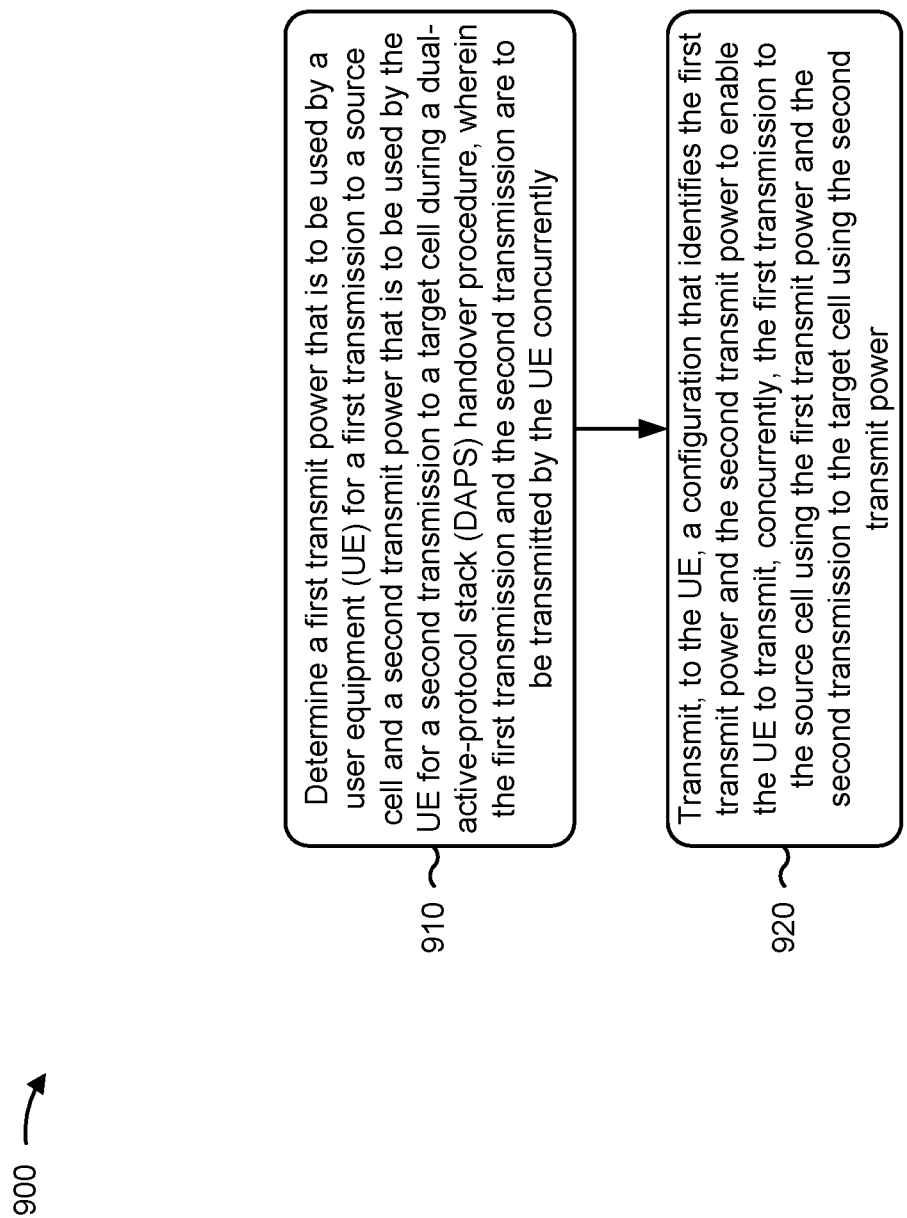
FIG. 9 is a diagram illustrating an example process performed, for example, by a network node, in accordance with various aspects of the present disclosure.

FIG. 9 is a diagram illustrating an example process 900 performed, for example, by a network node, in accordance with various aspects of the present disclosure. Example process 900 is an example where a network node (e.g., BS 110, and/or the like) performs operations associated with transmit power determination in DAPS handover.

As shown in FIG. 9, in some aspects, process 900 may include determining a first transmit power that is to be used by a UE for a first transmission to a source cell and a second transmit power that is to be used by the UE for a second transmission to a target cell during a DAPS handover procedure, wherein the first transmission and the second transmission are to be transmitted by the UE concurrently (block 910). For example, the network node (e.g., using controller/processor 240, and/or the like) may determine a first transmit power that is to be used by a UE for a first transmission to a source cell and a second transmit power that is to be used by the UE for a second transmission to a target cell during a DAPS handover procedure, as described above. In some aspects, the first transmission and the second transmission are to be transmitted by the UE concurrently.

As further shown in FIG. 9, in some aspects, process 900 may include transmitting, to the UE, a configuration that identifies the first transmit power and the second transmit power to enable the UE to transmit, concurrently, the first transmission to the source cell using the first transmit power and the second transmission to the target cell using the second transmit power (block 920). For example, the network node (e.g., using controller/processor 240, transmit processor 220, TX MIMO processor 230, MOD 232, antenna 234, and/or the like) may transmit, to the UE, a configuration that identifies the first transmit power and the second transmit power to enable the UE to transmit, concurrently, the first transmission to the source cell using the first transmit power and the second transmission to the target cell using the second transmit power, as described above.

Process 900 may include additional aspects, such as any single aspect or any combination of aspects described below and/or in connection with one or more other processes described elsewhere herein.

In a first aspect, a sum of the first transmit power and the second transmit power does not exceed a threshold transmit power. In a second aspect, alone or in combination with the first aspect, the first transmission and the second transmission are to be spatially multiplexed. In a third aspect, alone or in combination with one or more of the first and second aspects, the first transmission is to be transmitted to the source cell using a first beam and the second transmission is to be transmitted to the target cell using a second beam.

In a fourth aspect, alone or in combination with one or more of the first through third aspects, the first transmit power is based at least in part on a first proportion of a first initial transmit power determined for transmissions to the source cell, and the second transmit power is based at least in part on a second proportion of a second initial transmit power determined for transmissions to the target cell.

In a fifth aspect, alone or in combination with one or more of the first through fourth aspects, process 900 further includes determining (e.g., using controller/processor 240, and/or the like) that the first proportion is to be greater than the second proportion based at least in part on a determination that the first transmission is to be given a higher priority than the second transmission. In a sixth aspect, alone or in combination with one or more of the first through fifth aspects, process 900 further includes determining (e.g., using controller/processor 240, and/or the like) that the second proportion is to be greater than the first proportion based at least in part on a determination that the second transmission is to be given a higher priority than the first transmission. In a seventh aspect, alone or in combination with one or more of the first through sixth aspects, process 900 further includes determining (e.g., using controller/processor 240, and/or the like) that the first proportion is to be equal to the second proportion based at least in part on a determination that the first transmission and the second transmission are to be given an equal priority.

In an eighth aspect, alone or in combination with one or more of the first through seventh aspects, the first transmit power and the second transmit power are determined based at least in part on at least one of whether the source cell or the target cell is to be dropped as part of the DAPS handover procedure, a quality of service for the first transmission or the second transmission, or a type of channel associated with the first transmission or the second transmission.

In a ninth aspect, alone or in combination with one or more of the first through eighth aspects, the configuration is transmitted in a message of the DAPS handover procedure.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining a first transmit power that is to be used for a first transmission to a source cell and a second transmit power that is to be used for a second transmission to a target cell during a dual-active-protocol stack (DAPS) handover procedure,
      wherein the first transmission and the second transmission are to be transmitted concurrently,
      wherein the first transmit power is based at least in part on a first proportion of a first initial transmit power determined for transmissions to the source cell, and
      wherein the second transmit power is based at least in part on a second proportion of a second initial transmit power determined for transmissions to the target cell; and
   transmitting, concurrently, the first transmission to the source cell using the first transmit power and the second transmission to the target cell using the second transmit power.

2. The method of claim 1, wherein a sum of the first transmit power and the second transmit power does not exceed a threshold transmit power.

3. The method of claim 1, wherein the first transmission and the second transmission are spatially multiplexed.

4. The method of claim 1, wherein the first transmission is transmitted to the source cell using a first beam and the second transmission is transmitted to the target cell using a second beam.

5. The method of claim 1, further comprising determining that the first proportion is to be greater than the second proportion based at least in part on a determination that the first transmission is to be given a higher priority than the second transmission.

6. The method of claim 1, further comprising determining that the second proportion is to be greater than the first proportion based at least in part on a determination that the second transmission is to be given a higher priority than the first transmission.

7. The method of claim 1, further comprising determining that the first proportion is to be equal to the second proportion based at least in part on a determination that the first transmission and the second transmission are to be given an equal priority.

8. The method of claim 1, wherein the first transmit power and the second transmit power are determined further based at least in part on at least one of:
   whether the source cell or the target cell is to be dropped as part of the DAPS handover procedure;
   a quality of service for the first transmission or the second transmission; or
   a type of channel associated with the first transmission or the second transmission.

9. The method of claim 1, wherein the first proportion and the second proportion correspond to power scaling proportions determined for the first transmission and the second transmission.

10. A user equipment (UE) for wireless communication, comprising:
    a memory; and
    one or more processors operatively coupled to the memory, the one or more processors configured to:
       determine a first transmit power that is to be used for a first transmission to a source cell and a second transmit power that is to be used for a second transmission to a target cell during a dual-active-protocol stack (DAPS) handover procedure,
          wherein the first transmission and the second transmission are to be transmitted concurrently,
          wherein the first transmit power is based at least in part on a first proportion of a first initial transmit power determined for transmissions to the source cell, and
          wherein the second transmit power is based at least in part on a second proportion of a second initial transmit power determined for transmissions to the target cell; and
       transmit, concurrently, the first transmission to the source cell using the first transmit power and the second transmission to the target cell using the second transmit power.

11. The UE of claim 10, wherein a sum of the first transmit power and the second transmit power does not exceed a threshold transmit power.

12. The UE of claim 10, wherein the first transmission and the second transmission are spatially multiplexed.

13. The UE of claim 10, wherein the first transmission is transmitted to the source cell using a first beam and the second transmission is transmitted to the target cell using a second beam.

14. The UE of claim 10, wherein the one or more processors are further configured to determine that the first proportion is to be greater than the second proportion based at least in part on a determination that the first transmission is to be given a higher priority than the second transmission.

15. The UE of claim 10, wherein the one or more processors are further configured to determine that the second proportion is to be greater than the first proportion based at least in part on a determination that the second transmission is to be given a higher priority than the first transmission.

16. The UE of claim 10, wherein the one or more processors are further configured to determine that the first proportion is to be equal to the second proportion based at least in part on a determination that the first transmission and the second transmission are to be given an equal priority.

17. The UE of claim 10, wherein the first transmit power and the second transmit power are determined further based at least in part on at least one of:
    whether the source cell or the target cell is to be dropped as part of the DAPS handover procedure;
    a quality of service for the first transmission or the second transmission; or
    a type of channel associated with the first transmission or the second transmission.

18. The UE of claim 10, wherein the first proportion and the second proportion correspond to power scaling proportions determined for the first transmission and the second transmission.

19. A non-transitory computer-readable medium storing a set of instructions for wireless communication, the set of instructions comprising:
    one or more instructions that, when executed by one or more processors of a user equipment (UE), cause the UE to:
       determine a first transmit power that is to be used for a first transmission to a source cell and a second transmit power that is to be used for a second transmission to a target cell during a dual-active-protocol stack (DAPS) handover procedure,
wherein the first transmission and the second transmission are to be transmitted concurrently,
wherein the first transmit power is based at least in part on a first proportion of a first initial transmit power determined for transmissions to the source cell, and
wherein the second transmit power is based at least in part on a second proportion of a second initial transmit power determined for transmissions to the target cell; and
transmit, concurrently, the first transmission to the source cell using the first transmit power and the second transmission to the target cell using the second transmit power.

20. The non-transitory computer-readable medium of claim 19, wherein a sum of the first transmit power and the second transmit power does not exceed a threshold transmit power.

21. The non-transitory computer-readable medium of claim 19, wherein the first transmission and the second transmission are spatially multiplexed.

22. The non-transitory computer-readable medium of claim 19, wherein the first transmission is transmitted to the source cell using a first beam and the second transmission is transmitted to the target cell using a second beam.

23. The non-transitory computer-readable medium of claim 19, wherein the one or more instructions further cause the UE to determine that the first proportion is to be greater than the second proportion based at least in part on a determination that the first transmission is to be given a higher priority than the second transmission.

24. The non-transitory computer-readable medium of claim 19, wherein the one or more instructions further cause the UE to determine that the second proportion is to be greater than the first proportion based at least in part on a determination that the second transmission is to be given a higher priority than the first transmission.

25. The non-transitory computer-readable medium of claim 19, wherein the one or more instructions further cause the UE to determine that the first proportion is to be equal to the second proportion based at least in part on a determination that the first transmission and the second transmission are to be given an equal priority.

26. The non-transitory computer-readable medium of claim 19, wherein the first transmit power and the second transmit power are determined further based at least in part on at least one of:
whether the source cell or the target cell is to be dropped as part of the DAPS handover procedure;
a quality of service for the first transmission or the second transmission; or
a type of channel associated with the first transmission or the second transmission.

27. The non-transitory computer-readable medium of claim 19, wherein the first proportion and the second proportion correspond to power scaling proportions determined for the first transmission and the second transmission.

28. An apparatus for wireless communication, comprising:
means for determining a first transmit power that is to be used for a first transmission to a source cell and a second transmit power that is to be used for a second transmission to a target cell during a dual-active-protocol stack (DAPS) handover procedure,
wherein the first transmission and the second transmission are to be transmitted concurrently,
wherein the first transmit power is based at least in part on a first proportion of a first initial transmit power determined for transmissions to the source cell, and
wherein the second transmit power is based at least in part on a second proportion of a second initial transmit power determined for transmissions to the target cell; and
means for transmitting, concurrently, the first transmission to the source cell using the first transmit power and the second transmission to the target cell using the second transmit power.

29. The apparatus of claim 28, wherein a sum of the first transmit power and the second transmit power does not exceed a threshold transmit power.

30. The apparatus of claim 28, wherein the first transmission and the second transmission are spatially multiplexed.

31. The apparatus of claim 28, wherein the first transmission is transmitted to the source cell using a first beam and the second transmission is transmitted to the target cell using a second beam.

32. The apparatus of claim 28, further comprising means for determining that the first proportion is to be greater than the second proportion based at least in part on a determination that the first transmission is to be given a higher priority than the second transmission.

33. The apparatus of claim 28, further comprising means for determining that the second proportion is to be greater than the first proportion based at least in part on a determination that the second transmission is to be given a higher priority than the first transmission.

34. The apparatus of claim 28, further comprising means for determining that the first proportion is to be equal to the second proportion based at least in part on a determination that the first transmission and the second transmission are to be given an equal priority.

35. The apparatus of claim 28, wherein the first transmit power and the second transmit power are determined further based at least in part on at least one of:
whether the source cell or the target cell is to be dropped as part of the DAPS handover procedure;
a quality of service for the first transmission or the second transmission; or
a type of channel associated with the first transmission or the second transmission.

36. The apparatus of claim 28, wherein the first proportion and the second proportion correspond to power scaling proportions determined for the first transmission and the second transmission.

* * * * *